Oct. 23, 1934.                T. W. MORRIS                1,977,804
                            TRIMMING MACHINE
                          Filed Jan. 16, 1932
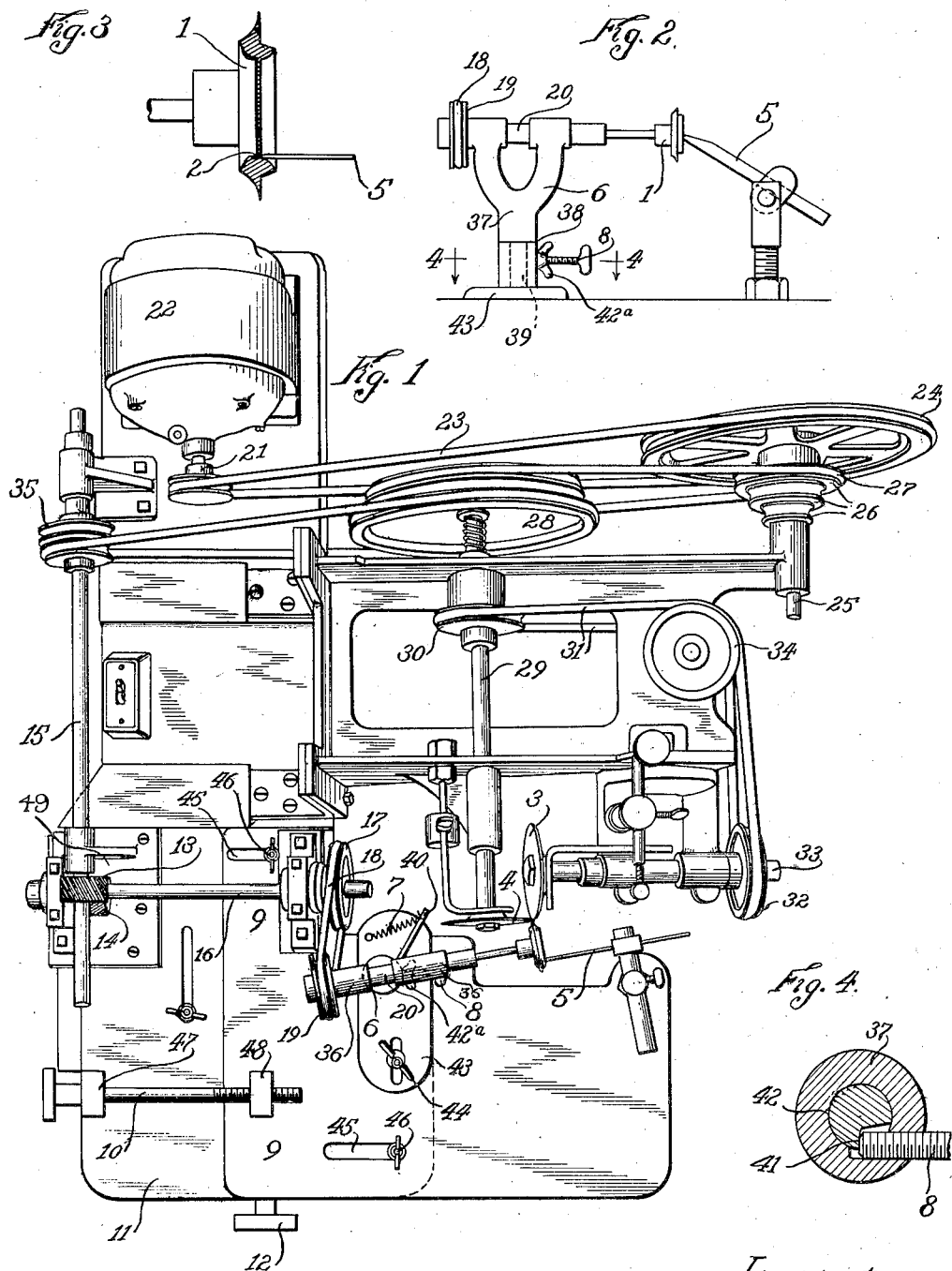
Inventor:
T. W. Morris
By Jones, Addington, Ames & Seibold.
Attys.

Patented Oct. 23, 1934

1,977,804

UNITED STATES PATENT OFFICE 1,977,804

TRIMMING MACHINE

Thomas W. Morris, Chicago, Ill.

Application January 16, 1932, Serial No. 587,093

14 Claims. (Cl. 164—63)

My invention relates to apparatus for trimming rubber articles.

One of the objects of my invention is to provide improved apparatus for trimming the inner annular flash from an annular rubber article.

A further object is to provide improved means for simultaneously trimming both the inner and outer annular flashes from an annular rubber article.

Further objects will appear from the description and claims.

In the drawing, in which an embodiment of my invention is shown,

Figure 1 is a perspective plan view of a machine embodying my invention;

Fig. 2 is a side elevation showing the work arbor and oscillatable trimming blade;

Fig. 3 is an enlarged view of the work arbor and the rubber gasket mounted thereon; and Fig. 4 is a section substantially on the line 4—4 of Fig. 2.

Referring to the drawing in detail, the apparatus shown therein for trimming the inner and outer flashes from an annular rubber article comprises a rotatable circular arbor 1 on which the annular article is fitted having a circular flash supporting edge 2 engaging the article adjacent the line of trim of the inner annular flash, means for trimming the outside annular flash as the arbor rotates comprising a pair of circular cutting discs 3 and 4, the circular cutting edge of one of said discs 3 bearing against the side of the other cutting disc 4, means for trimming the inside annular flash as the arbor rotates comprising an oscillatable blade 5 mounted for swinging movement to bring the cutting edge of the blade against the inside annular flash on the line of trim, a portion of the cutting edge of the blade being movable past the annular flash supporting edge of the rotatable arbor, means 6 for supporting said arbor for swinging movement about an axis transverse to the axis of the arbor, spring means 7 tending to swing the arbor toward the trimming means for the outside flash, an adjustable stop 8 for limiting the swinging movement of the supporting means, adjustable means for moving said arbor bodily in one direction comprising a slide 9 and a feed screw 10 for moving said slide, adjustable means for moving said arbor bodily in a direction at an angle to said first direction comprising a second slide 11 on which said first slide is mounted and a second feed screw 12 for moving said second slide, and means for driving said arbor comprising a pair of helical gears 13 and 14 mounted on said second slide and a shaft splined to the driving helical gear and a shaft 16 splined to the driven helical gear.

Before describing the apparatus in further detail, I will briefly outline the operation.

The apparatus is put in operation to cause the work arbor 1 and the trimming discs 3 and 4 to rotate. The operator fits the annular article to be trimmed onto the work arbor. The outside rind is instantly removed by cutting discs 3 and 4. The operator then swings the knife 5 to bring the cutting edge against the inner annular flash on the line of trim, as shown in Figs. 2 and 3, a portion of the cutting edge of the blade being movable past the annular flash supporting edge 2 of the rotatable arbor, thus making a smooth shearing cut. Thus both the inner and outer annular flashes are trimmed, the outer flash being trimmed by the cutting discs 3 and 4 and the inner flash being trimmed by the oscillatable blade 5.

The arbor 1 is driven from the shaft 16 by means of a pulley 17 mounted on the shaft 16, a belt 18 running over the pulley, a pulley 19 driven by the belt, and a shaft 20 on which the pulley is mounted and on which the work arbor 1 also is mounted. The cutting disc 3 is driven from the electric motor 22 by means of the motor pulley 21, a belt 23 running over the motor pulley, a pulley 24 driven by this belt, a shaft 25 on which this pulley is mounted, a stepped pulley 26 mounted on this shaft, a belt 27 running over this stepped pulley, another stepped pulley 28 driven by this belt, a shaft 29 on which this stepped pulley is mounted, a pulley 30 rotatable with this shaft, a belt 31 running over this pulley, a pulley 32 driven by this belt, and a shaft 33 on which this pulley is mounted and on which the cutting disc 3 also is mounted. Suitable guide pulleys 34 are provided for the belt.

The cutting disc 4 is mounted on the same shaft 29 on which the stepped pulley 28 is mounted. The shaft 15 is driven from the stepped pulley 28 by means of a belt 34a running over this stepped pulley, and another stepped pulley 35 driven by this belt and mounted on the shaft 15.

The shaft 20 of the work arbor 1 is rotatably mounted in a pair of spaced bearings 36 at the upper end of a forked bracket 37 which is swingingly mounted at 38 in a swivel bearing 39. The tension spring 7, secured to an arm 40 extending laterally from the forked bracket 37, tends to move the work arbor 1 toward the cutting discs 3 and 4. The distance to which the arbor can swing is limited by the adjustable stop 8 which, as shown, is in the form of a screw threaded into the swivel bearing 39 in such a manner that its point serves as a stop for the wall of the recess 41 formed in the journal portion 42 of the forked bracket 37. If desired, a lock nut 42a may be provided to hold the stop 8 in adjusted position. The swivel bearing may be provided with a base portion 43 adjustably mounted on the slide 9 by means of a screw and slot connection 44. The slide 9 is guided in its movement on slide 11 by means of guide slots 45 in the slide cooperating with studs 46 extending upwardly from the slide 11. The feed screw 10 is swiveled in a bearing 47 on the slide 11 and threaded into a feed nut 48 secured to or formed integral with the slide 9.

The two helical gears 13 and 14 may be held in position by a bracket 49 mounted on the slide 11 in such a manner that the shaft 16 can slide through the helical gear 14, due to the splined connection therebetween, and in such a manner that the helical gear 13 can slide along the shaft 15, due to the splined connection therebetween.

The trimming discs 3 and 4 may be, in general, of the type disclosed in my United States Letters Patent No. 1,361,531.

Further modifications will be apparent to those skilled in the art and it is desired, therefore, that the invention be limited only by the prior art and the scope of the appended claims.

Having thus described my invention, what I claim and desire to secure by Letters Patent is:

1. Apparatus for trimming the annular flash from an annular rubber article comprising a rotatable circular arbor on which the annular article is fitted having a circular flash supporting edge engaging the article adjacent the line of trim, and an oscillatable blade mounted for swinging movement in a plane which is substantially parallel to the axis of the arbor and which is substantially tangential to the circle of trim to bring the cutting edge of the blade against the annular flash on the line of trim.

2. Apparatus for trimming the annular flash from an annular rubber article comprising a rotatable circular arbor on which the annular article is fitted having a circular flash supporting edge engaging the article adjacent the line of trim, and an oscillatable blade mounted for swinging movement in a plane which is substantially parallel to the axis of the arbor and which is substantially tangential to the circle of trim to bring the cutting edge of the blade against the annular flash on the line of trim, a portion of the cutting edge of the blade being movable past the annular flash supporting edge of the rotatable arbor.

3. Apparatus for trimming the annular flash from an annular rubber article comprising a rotatable circular arbor on which the annular article is fitted having a circular flash supporting edge engaging the article adjacent the line of trim, an oscillatable blade mounted for swinging movement to bring the cutting edge of the blade against the annular flash on the line of trim, a portion of the cutting edge of the blade being movable past the annular flash supporting edge of the rotatable arbor, and means for supporting said arbor for swinging movement about an axis transverse to the axis of the arbor.

4. Apparatus for trimming the annular flash from an annular rubber article comprising a rotatable circular arbor on which the annular article is fitted having a circular flash supporting edge engaging the article adjacent the line of trim, an oscillatable blade mounted for swinging movement to bring the cutting edge of the blade against the annular flash on the line of trim, a portion of the cutting edge of the blade being movable past the annular flash supporting edge of the rotatable arbor, means for supporting said arbor for swinging movement about an axis transverse to the axis of the arbor, trimming means for the outside flash, spring means tending to swing the arbor toward the trimming means for the outside flash, and an adjustable stop for limiting the swinging movement of the supporting means.

5. Apparatus for trimming the annular flash from an annular rubber article comprising a rotatable circular arbor on which the annular article is fitted having a circular flash supporting edge engaging the article adjacent the line of trim, an oscillatable blade mounted for swinging movement to bring the cutting edge of the blade against the annular flash on the line of trim, a portion of the cutting edge of the blade being movable past the annular flash supporting edge of the rotatable arbor, adjustable means for moving said arbor bodily in one direction, and adjustable means for moving said arbor bodily in a direction at an angle to said first direction.

6. Apparatus for trimming the annular flash from an annular rubber article comprising a rotatable circular arbor on which the annular article is fitted having a circular flash supporting edge engaging the article adjacent the line of trim, an oscillatable blade mounted for swinging movement to bring the cutting edge of the blade against the annular flash on the line of trim, a portion of the cutting edge of the blade being movable past the annular flash supporting edge of the rotatable arbor, and adjustable means for moving said arbor bodily in one direction comprising a slide and a feed screw for moving said slide.

7. Apparatus for trimming the annular flash from an annular rubber article comprising a rotatable circular arbor on which the annular article is fitted having a circular flash supporting edge engaging the article adjacent the line of trim, an oscillatable blade mounted for swinging movement to bring the cutting edge of the blade against the annular flash on the line of trim, a portion of the cutting edge of the blade being movable past the annular flash supporting edge of the rotatable arbor, adjustable means for moving said arbor bodily in one direction comprising a slide and a feed screw for moving said slide, and adjustable means for moving said arbor bodily in a direction at an angle to said first direction comprising a second slide on which said first slide is mounted and a second feed screw for moving said second slide.

8. Apparatus for trimming the annular flash from an annular rubber article comprising a rotatable circular arbor on which the annular article is fitted having a circular flash supporting edge engaging the article adjacent the line of trim, an oscillatable blade mounted for swinging movement to bring the cutting edge of the blade against the annular flash on the line of trim, a portion of the cutting edge of the blade being movable past the annular flash supporting edge of the rotatable arbor, adjustable means for moving said arbor bodily in one direction comprising a slide and a feed screw for moving said slide, adjustable means for moving said arbor bodily in a direction at an angle to said first direction comprising a second slide on which said first slide is mounted and a second feed screw for moving said second slide, and means for driving said arbor comprising a pair of helical gears mounted on said second slide and a shaft splined to the driving helical gear and a shaft splined to the driven helical gear.

9. Apparatus for trimming the inner and outer annular flashes from an annular rubber article comprising a rotatable circular arbor on which the annular article is fitted having a circular flash supporting edge engaging the article adjacent the line of trim of the inner annular flash, means for trimming the outside annular flash as the arbor rotates, and means for trimming the inside annular flash as the arbor rotates comprising an oscillatable blade mounted for swinging movement about an axis transverse to the trimming plane to bring the cutting edge of the blade against the inside annular flash on the line of trim.

10. Apparatus for trimming the inner and outer annular flashes from an annular rubber article comprising a rotatable circular arbor on which the annular article is fitted having a circular flash supporting edge engaging the article adjacent the line of trim of the inner annular flash, means for trimming the outside annular flash as the arbor rotates, and means for trimming the inside annular flash as the arbor rotates comprising an oscillatable blade mounted for swinging movement to bring the cutting edge of the blade against the inside annular flash on the line of trim, a portion of the cutting edge of the blade being movable past the annular flash supporting edge of the rotatable arbor.

11. Apparatus for trimming the inner and outer annular flashes from an annular rubber article comprising a rotatable circular arbor on which the annular article is fitted having a circular flash supporting edge engaging the article adjacent the line of trim of the inner annular flash, means for trimming the outside annular flash as the arbor rotates comprising a pair of circular cutting discs, and means for trimming the inside annular flash as the arbor rotates comprising an oscillatable blade mounted for swinging movement about an axis transverse to the trimming plane to bring the cutting edge of the blade against the inside annular flash on the line of trim.

12. Apparatus for trimming the inner and outer annular flashes from an annular rubber article comprising a rotatable circular arbor on which the annular article is fitted having a circular flash supporting edge engaging the article adjacent the line of trim of the inner annular flash, means for trimming the outside annular flash as the arbor rotates comprising a pair of circular cutting discs, the circular cutting edge of one of said discs bearing against the side of the other cutting disc, and means for trimming the inside annular flash as the arbor rotates comprising an oscillatable blade mounted for swinging movement to bring the cutting edge of the blade against the inside annular flash on the line of trim.

13. Apparatus for trimming the inner and outer annular flashes from an annular rubber article comprising a rotatable circular arbor on which the annular article is fitted having a circular flash supporting edge engaging the article adjacent the line of trim of the inner annular flash, means for trimming the outside annular flash as the arbor rotates comprising a pair of circular cutting discs, the circular cutting edge of one of said discs bearing against the side of the other cutting disc, and means for trimming the inside annular flash as the arbor rotates comprising an oscillatable blade mounted for swinging movement to bring the cutting edge of the blade against the inside annular flash on the line of trim, a portion of the cutting edge of the blade being movable past the annular flash supporting edge of the rotatable arbor.

14. Apparatus for trimming the annular flash from an annular rubber article comprising a rotatable circular arbor on which the annular article is fitted having a circular flash supporting edge engaging the article adjacent the line of trim, and a blade mounted for movement to bring the cutting edge against the annular flash on the line of trim and to move a portion of the cutting edge of the blade into engagement with and past the annular flash supporting edge of the rotatable arbor.

THOMAS W. MORRIS.